United States Patent
Dwyer (10) Patent No.: US 12,140,606 B2
(45) Date of Patent: Nov. 12, 2024

(54) BIAS PERFORMANCE IN FORCE BALANCE ACCELEROMETERS

(71) Applicant: Honeywell International Inc., Charlotte, NC (US)

(72) Inventor: Paul W. Dwyer, Seattle, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/817,263

(22) Filed: Aug. 3, 2022

(65) Prior Publication Data

US 2024/0044933 A1    Feb. 8, 2024

(51) Int. Cl.
| | |
|---|---|
| *G01P 15/13* | (2006.01) |
| *G01P 1/00* | (2006.01) |
| *G01P 1/02* | (2006.01) |

(52) U.S. Cl.
CPC ............ *G01P 15/132* (2013.01); *G01P 1/006* (2013.01); *G01P 1/023* (2013.01)

(58) Field of Classification Search
CPC ........ G01P 15/132; G01P 15/13; G01P 1/023; G01P 1/006
See application file for complete search history.

(56) References Cited

U.S. PATENT DOCUMENTS

| | | | |
|---|---|---|---|
| 3,702,073 A | 11/1972 | Jacobs | |
| 4,555,944 A * | 12/1985 | Hanson | B23P 11/02 73/431 |
| 4,637,255 A | 1/1987 | Martin | |
| 4,697,455 A * | 10/1987 | Norling | G01P 15/132 73/497 |
| 4,726,228 A | 2/1988 | Norling | |
| 4,841,772 A | 6/1989 | Paik | |
| 4,872,342 A | 10/1989 | Hanson et al. | |
| 4,918,987 A * | 4/1990 | Vescial | G01P 15/18 73/514.19 |
| 5,097,172 A * | 3/1992 | Becka | G01P 1/006 310/348 |
| 5,182,949 A * | 2/1993 | Rupnick | G01P 15/132 73/514.01 |
| 5,212,984 A * | 5/1993 | Norling | G01D 11/30 73/497 |
| 5,292,569 A | 3/1994 | Barry et al. | |
| 6,257,060 B1 | 7/2001 | Leonardson et al. | |

(Continued)

FOREIGN PATENT DOCUMENTS

WO    2013066824 A1    5/2013

OTHER PUBLICATIONS

Zerodur K20, Schott, May 2013.*

(Continued)

*Primary Examiner* — Helen C Kwok
(74) *Attorney, Agent, or Firm* — Shumaker & Sieffert, P.A.

(57) ABSTRACT

An example accelerometer includes a first excitation ring comprising a first material having a first coefficient of thermal expansion (CTE), a second excitation ring comprising the first material having the first CTE; and a proof mass assembly disposed between and in contact with the first excitation ring and the second excitation ring. The proof mass assembly comprises a second material having a second CTE, wherein a difference between the first CTE and the second CTE is equal to or less than 0.5 parts per million per degree Celsius (ppm/° C.).

17 Claims, 3 Drawing Sheets

(56) References Cited

U.S. PATENT DOCUMENTS

| | | | |
|---|---|---|---|
| 9,778,039 B2 | 10/2017 | Najafi et al. | |
| 9,784,759 B2 | 10/2017 | Cox | |
| 9,810,594 B2 | 11/2017 | Sanzari | |
| 10,161,956 B2 | 12/2018 | Dwyer | |
| 11,169,175 B2 | 11/2021 | Dwyer et al. | |
| 2006/0117853 A1* | 6/2006 | Dwyer | G01P 15/132 |
| | | | 73/514.17 |
| 2016/0202135 A1* | 7/2016 | Sanzari | G01L 9/0079 |
| | | | 73/705 |
| 2017/0115321 A1* | 4/2017 | Dwyer | G01P 15/125 |
| 2017/0138980 A1* | 5/2017 | Cox | G01P 15/11 |
| 2020/0072862 A1* | 3/2020 | Dwyer | G01P 15/125 |
| 2021/0172974 A1* | 6/2021 | Dwyer | B23K 26/21 |

OTHER PUBLICATIONS

Wikipedia webpage for "Invar".*

"36 Alloy Invar Properties & Low Coefficient of Thermal Expansion", National Electronic Alloys, Retrieved from https://www.nealloys.com/invar_invar.php, accessed on Apr. 4, 2022, 2 pp.

"ZERODUR® K20 Glass ceramic with low thermal expansion for high temperature applications" SCHOTT AG, Retrieved from file:///C:/Users/sxe/Downloads/schott-zerodur-k20-glass-ceramic-product-flyer-en%20(2).pdf, accessed on Mar. 11, 2022, 1 page.

"ZERODUR® Zero Expansion Glass Ceramic", SCHOTT AG, Retrieved from https://www.advancedoptics.com/ZerodurTechnicalDataSheet.pdf, accessed on Apr. 4, 2022, pp. 1-24.

"ZERODUR®—Extremely low Expansion Glass Ceramic", SCHOTT AG, Retrieved from https://www.knightoptical.com/wp-content/uploads/2021/08/schott-zerodur-glass-ceramic-product-flyer-en.pdf, Accessed on Mar. 11, 2022, 1 page.

"ZERODUR® Low-thermal-expansion glass-ceramic with exceptional properties", SCHOTT AG, Retrieved from https://www.schott.com/en-dk/products/zerodur-p1000269/technical-details?tab=fa8b6e90bda04dea8e62b2dafc7665d0, Accessed on Apr. 4, 2022, 7 pp.

Hartmann et al., "Glass ceramic ZERODUR®: Even closer to zero thermal expansion: a review, part 1", SCHOTT AG, Jun. 3, 2021, pp. 1-23.

Hartmann et al., "ZERODUR® Glass Ceramics for High Stress Applications", Proceedings of SPIE—The International Society for Optical Engineering, vol. 7425, ResearchGate, Aug. 21, 2009, pp. 1-11.

* cited by examiner

BIAS PERFORMANCE IN FORCE BALANCE ACCELEROMETERS

TECHNICAL FIELD

The disclosure relates to magnetic circuit assemblies such as magnetic circuit assemblies for accelerometers.

BACKGROUND

Accelerometers function by detecting the displacement of a proof mass under inertial forces. An accelerometer assembly may, for example, detect the displacement of a proof mass by a capacitive pick-off system. In this example, a capacitor pick-off plate may be deposited on the upper surface of the proof mass, and a similar capacitor pick-off plate may be deposited on the lower surface of the proof mass. The capacitor plates cooperate with the inwardly facing surfaces of upper and lower magnetic circuit assemblies to provide the capacitive pick-off system. Additionally, a force-rebalancing system may be used to detect the displacement of the proof mass, where coil forms with force-rebalancing coils are mounted on either side of the proof mass. The force-rebalancing coils cooperate with permanent magnets in the upper and lower magnetic circuit assemblies and with a suitable feedback circuit to retain the proof mass at a predetermined position (i.e., a null position) with respect to the support structure. Acceleration applied to the accelerometer assembly may be determined based on the change in capacitance with respect to the capacitor pick-off plates or the current increase in the force-rebalancing coils to maintain the proof mass in the null position.

SUMMARY

The disclosure describes techniques and devices that reduce thermal expansion induced errors in a magnetic circuit assembly such as those used in a force-rebalance accelerometer by, for example, reducing coefficient of thermal expansion (CTE) mismatches between the excitation rings and proof mass assembly of the accelerometer. The devices described herein may also exhibit reduced hysteresis effects in an acceleration measurement (e.g., the inability of the proof mass to return to a null position).

In some examples, a force-rebalance accelerometer includes a proof mass assembly made from a manufacturable, machinable, dielectric material having a CTE substantially matching the CTE of the magnetic material comprising the excitation rings of the accelerometer, e.g., the CTEs of the proof mass assembly and the excitation rings matching to within 0.5 parts per million per degree Celsius (ppm/° C.). Matching the CTEs of the proof mass assembly and the excitation rings reduces device hysteresis caused by strain on the proof mass assembly by the excitation rings that changes with temperature, e.g., by reducing changes to the strain exerted on the proof mass assembly by the excitation rings thereby reducing changes to resonant frequency modes of the proof mass when the accelerometer experiences a force and/or is accelerated.

In some examples, other components of the accelerometer may be adjusted as a consequence of substantially matching the CTE of the proof mass assembly and the excitation rings. For example, the material of an outer support structure configured to maintain an axial compression preload force configured to hold the excitation rings in position relative to each other and the proof mass assembly and to maintain a capacitive gap between the excitation rings may rely on a CTE mismatch between the outer support structure and a CTE of the combined CTE of the assembled excitation rings and proof mass assembly. In some examples, the outer support structure may comprise a material that increases such a CTE mismatch in order to maintain the axial compression preload force at operating temperatures. For example, the outer support structure may be a bellyband having a CTE that differs from the CTE of the excitation rings and proof mass assembly by equal to or greater than 1.0 ppm/° C.

In one example, this disclosure describes an accelerometer including: a first excitation ring comprising a first material having a first coefficient of thermal expansion (CTE); a second excitation ring comprising the first material having the first CTE; and a proof mass assembly disposed between and in contact with the first excitation ring and the second excitation ring, the proof mass assembly comprising a second material having a second CTE, wherein a difference between the first CTE and the second CTE is equal to or less than 0.5 parts per million per degree Celsius (ppm/° C.).

In another example, this disclosure describes a transducer including: a first excitation ring comprising Invar having a first coefficient of thermal expansion (CTE); a second excitation ring comprising Invar and having the first CTE; a proof mass assembly disposed between and in contact with the first excitation ring and the second excitation ring, the proof mass assembly comprising Zerodur® K20 having a second CTE, wherein a difference between the first CTE and the second CTE is equal to or less than 0.5 parts per million per degree Celsius (ppm/° C.).

In another example, this disclosure describes a proof mass assembly including: a proof mass; a support structure; and at least one flexure mechanically coupling the proof mass to the support structure, wherein the at least one flexure is configured to allow the proof mass to move relative to the support structure in at least one direction, and wherein each of the proof mass, support structure, and at least one flexure comprise Zerodur® K20 having a first CTE, wherein the proof mass assembly is configured to be disposed between and in contact with a first excitation ring and a second excitation ring each comprising a second material having a second CTE, and wherein a difference between the first CTE and the second CTE is equal to or less than 0.5 parts per million per degree Celsius (ppm/° C.).

The details of one or more examples of the disclosure are set forth in the accompanying drawings and the description below. Other features, objects, and advantages of the disclosure will be apparent from the description and drawings, and from the claims.

DETAILED DESCRIPTION

In some examples, the present disclosure describes techniques and devices that may provide reduced thermal expansion induced errors in acceleration measurements associated with the magnetic circuit assemblies and/or proof mass assemblies of accelerometers, and improve magnetic return paths within the described magnetic circuit assemblies by improving the CTE compatibilities of components within the accelerometer. An accelerometer may operate by measuring changes to directional force exerted on the accelerometer with respect to an inertial reference frame. A force-rebalance accelerometer may include a proof mass assembly formed from a manufacturable, machinable, dielectric material having a coefficient of thermal expansion (CTE) substantially matching the CTE of a magnetic material comprising the excitation rings of the accelerometer. In other words, the CTEs of the proof mass assembly and the excitation rings match to within 0.5 parts per million per degree Celsius (ppm/° C.). The proof mass may be suspended by one or more flexures to enable the proof mass to deflect in response to forces or accelerations along a sensing axis or "input axis" that is generally perpendicular to the plane of the proof mass. At rest, the proof mass may be suspended equidistantly between upper and lower excitation rings. Electrically conductive material forming pick-off capacitance plates may be disposed on opposing sides of the proof mass to form capacitive elements with the excitation rings. An acceleration or force applied along the sensing axis causes the proof mass to deflect either upwardly or downwardly. The deflection causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensing axis. This displacement signal may be applied to a servo system that includes one or more electromagnets which function to return the proof mass to its null or at-rest position. The magnitude of the drive currents applied to the electromagnets, in turn, is representative of the acceleration or force along the sensing axis.

Navigation systems and positioning systems rely on the accuracy of accelerometers to perform operations. The accuracy of some accelerometers may be limited by bias instabilities (e.g., a change in the physical structure of the accelerometer assembly) caused by physical or thermal strains. For example, bias instabilities may be created due to heating and cooling effects that occur during the construction process or general operation of the accelerometer. The heating and cooling effects may introduce stress on the accelerometer due to CTE mismatches between the materials used to construct components of the accelerometer. The CTE mismatches may alter the position of the proof mass, alter the capacitive gaps between the proof mass and the upper and lower magnetic circuit assemblies, alter the connection between the magnet and excitation ring within a magnetic circuit assembly, alter resonant frequency modes of the proof mass, and/or cause other effects that create false or inaccurate acceleration readings. For example, the electromagnetic circuit assemblies may include components, e.g., the excitation rings, formed from a material having a relatively high permeability, such as Invar-36 or Super Invar, to form a magnetic return path. Invar-36 or Super Invar excitation rings may have a CTE of about 1.5 parts per million per degree Celsius (ppm/° C.), and conventional proof mass assemblies may have a CTE of about 0.5 ppm/° C. As such, the interface defined between portions of a support structure of the proof mass assembly in contact with the upper and lower excitation rings may be subject to stress as a function of temperature. Such stress over a period of time and/or temperature range may create temperature-induced false acceleration signals, e.g., due to hysteresis of the response of the proof mass, compromising the precision and accuracy of motion-sourced acceleration as well as degrading the performance of the accelerometer.

The techniques and devices disclosed herein are intended to reduce the thermally induced error effects observed within accelerometers as well as improve the magnetic return paths within the accelerometers. In some examples, a proof mass assembly is formed from an inorganic glass ceramic material rather than amorphous quartz. In some examples, the inorganic glass ceramic comprises a plurality of micro-crystallites embedded within a glassy phase, and the CTE of the inorganic glass ceramic may be tuned by changing the size, amount, and distribution of the micro-crystallites. In some examples, the proof mass assembly may be made of Zerodur® K20 having a CTE that substantially matches the CTE of Invar-36 or Super Invar, e.g., having a CTE that differs from Invar-36 or Super Invar by less than or equal to 0.5 ppm/° C.

Figure 1:
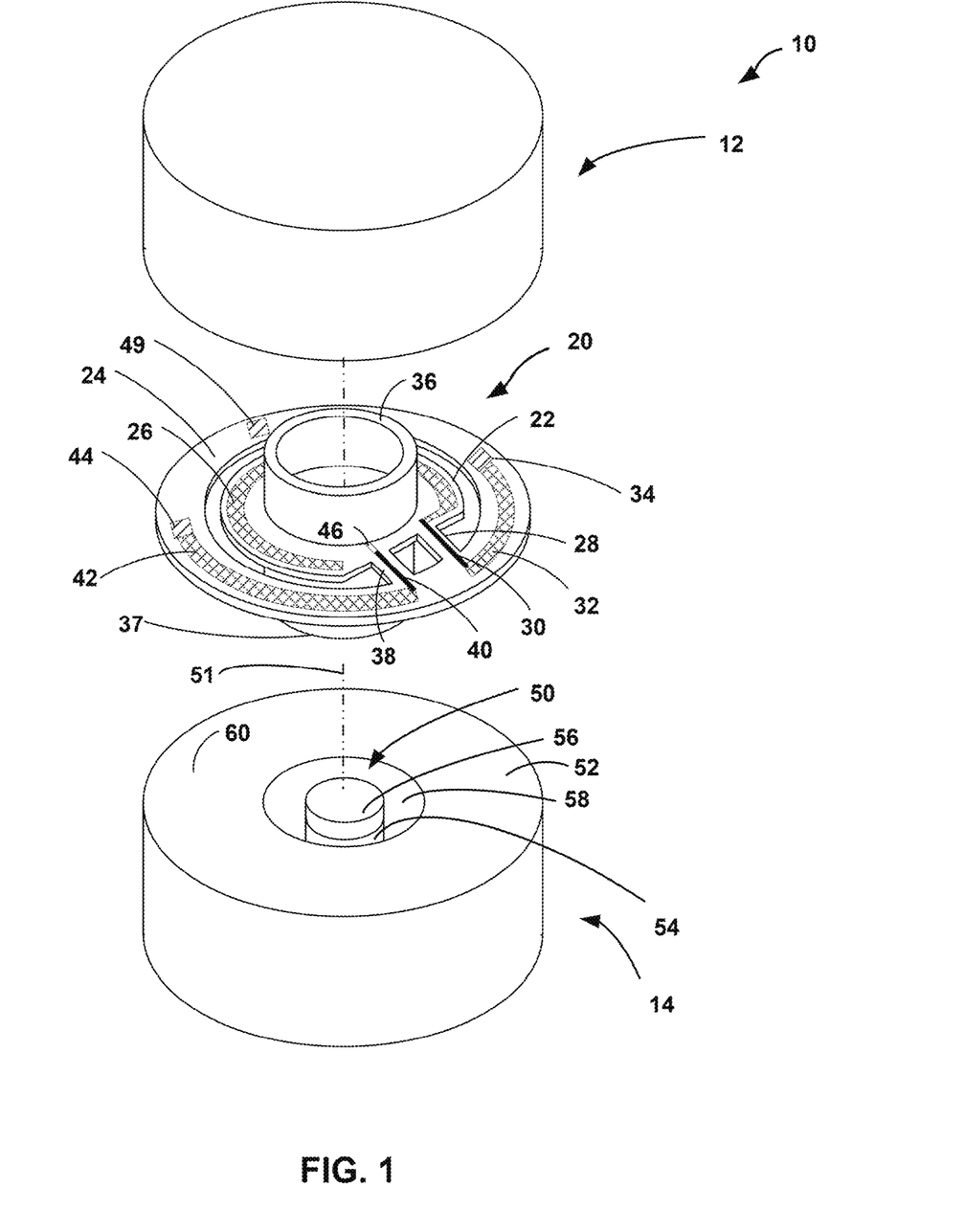
FIG. 1 is schematic diagram illustrating an exploded view of an example accelerometer that includes an upper magnetic circuit assembly, a lower magnetic circuit assembly, and a proof mass assembly disposed between the upper and lower magnetic circuit assemblies.

FIG. 1 is an exploded view diagram illustrating an example accelerometer 10 (e.g., a force-rebalance accelerometer). In the example shown, accelerometer 10 includes an upper magnetic circuit assembly 12, a lower magnetic circuit assembly 14 (e.g., collectively "upper and lower magnetic circuit assemblies 12 and 14"), and a proof mass assembly 20 disposed between upper and lower magnetic circuit assemblies 12 and 14. Proof mass assembly 20 may include a proof mass 22, a proof mass support structure 24, and a first flexure 28 and a second flexure 38 (collectively "flexures 28 and 38") flexibly connecting proof mass 22 to proof mass support structure 24.

Accelerometer 10 defines input axis 51. Accelerometer 10 is configured to detect a movement stimulus along input axis 51. In the example of FIG. 1, accelerometer 10 is illustrated as a capacitive transducer that detects a change in capacitance in response to the movement stimulus, as will be described further below; however, accelerometer 10 may use one or more alternative or additional mechanisms to detect a movement stimulus along input axis 51. In the example of FIG. 1, accelerometer 10 has a generally cylindrical shape; however, in other examples, other shapes may be used.

In the example shown, proof mass assembly 20 is disposed between upper and lower magnetic circuit assemblies 12 and 14. Upper and lower magnetic circuit assemblies 12 and 14 may each include an excitation ring, a permanent magnet, and a pole piece. Each excitation ring may include an inwardly facing surface that faces proof mass assembly 20 and interacts with (e.g., may be coupled to) portions of the proof mass assembly 20. Upper and lower magnetic circuit assemblies 12 and 14 are coupled by an outer support structure (not shown), e.g., a bellyband. The bellyband may be fixed to upper and lower magnetic circuit assemblies 12 and 14 using, for example, an epoxy, thereby securing upper and lower magnetic circuit assemblies 12 and 14 after they are assembled with, or clamped to, proof mass assembly 20. In some examples, the outer support structure may have a CTE that differs from the CTE of the excitation rings and proof mass assembly by equal to or greater than 1.0 ppm/° C., e.g., so as to maintain and/or achieve a desired axial preload force. For example, the CTE of the outer support structure may be configured to maintain a capacitive gap between upper and lower magnetic circuit assemblies 12 and 14 via the axial preload force, e.g., during acceleration and/or environmental changes.

Figure 2:
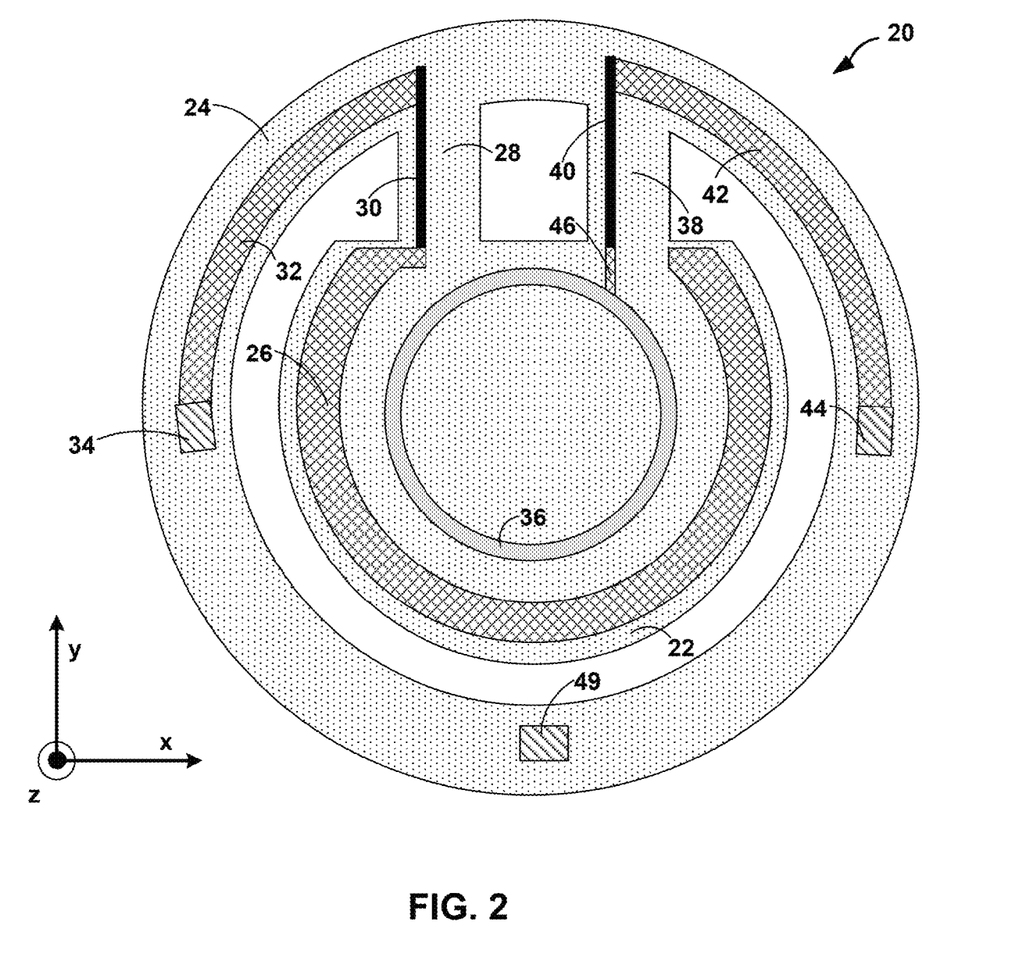
FIG. 2 is a conceptual diagram illustrating a top-view of an example proof mass assembly.

Proof mass support structure 24 may provide structural support for proof mass 22 and help maintain separation between proof mass 22 and upper and lower magnetic circuit assemblies 12 and 14. Although proof mass support structure 24 as shown in FIG. 1 is a circular shape, proof mass support structure 24 may be any shape (e.g., square, rectangular, oval, or the like) and may or may not surround proof mass 22. Proof mass 22 may be flexibly coupled to proof mass support structure 24 using one or more flexures 28 and 38 to support proof mass 22 within proof mass support structure 24 and enable proof mass 22 to move about the plane defined by proof mass support structure 24. For example, FIG. 2 shows a conceptual diagram illustrating a top-view of proof mass assembly 20. As shown, support structure 24 may be in a form of a planar ring structure that substantially surrounds proof mass 22 and substantially maintains flexures 28 and 38 and proof mass 22 in a common plane (e.g., the x-y plane of FIG. 2). Flexures 28 and 38 may be stiff in a radial direction (e.g., perpendicular to input axis 51) and flexible in a vertical direction (e.g., along input axis 51), such that flexures 28 and 38 allow proof mass 22 to move in a direction substantially orthogonal (e.g., orthogonal or nearly orthogonal) to a plane defined by proof mass support structure 24 due to acceleration of accelerometer 10.

In some examples, proof mass support structure 24 may also include a plurality of electrical traces 32 and 42. Electrical traces 32 and 42 may be formed on a single surface of proof mass support structure 24 (e.g., upper surface) or on multiple surfaces (e.g., upper, lower, and side surfaces) of proof mass support structure 24. Electrical traces 32 and 42 may electrically communicate with thin film leads 30 and 40 to transmit an electrical signal. Additionally, in some examples electrical traces 32 and 42 may be electrically connected to upper and lower magnetic circuit assemblies 12 and 14 (e.g., via electrical mounting pads 34 and 44) to establish electrical connections with other components, including additional circuitry, of accelerometer 10 or to other devices in which accelerometer 10 is installed. Flexures 28 and 38 may contain one or more thin film leads 30 and 40 on an upper or lower surface of the respective flexure of flexures 28 and 38 configured to transmit an electrical signal across the respective flexure.

Proof mass support structure 24 may also include one or more mounting pads 34, 44, and 49 positioned at various locations on proof mass support structure 24. In some examples, mounting pads 34, 44, and 49 may be raised such that when accelerometer 10 is fully assembled, mounting pads 34, 44, and 49 may contact upper and lower magnetic circuit assemblies 12 and 14 to separate proof mass assembly 20 from upper and lower magnetic circuit assemblies 12 and 14 as well as provide mounting support for proof mass assembly 20. Mounting pads 34, 44, and 49 may take on any form or shape and may be present in any quantity. In some examples, the height of mounting pads 34, 44, and 49 may define the capacitive gaps between upper and lower magnetic circuit assemblies 12 and 14 and the upper and lower capacitance pick-off plates (e.g., upper capacitance pick-off plate 26) on proof mass 22. In some examples, the height of mounting pads 34, 44, and 49 may be between half of one-thousandth to one-thousandth of an inch. In some examples, mounting pads 34, 44, and 49 may be on both sides of proof mass support structure 24.

Mounting pads 34, 44, and 49 may be configured to electrically connect components and circuitry of proof mass assembly 20 with other components, including additional circuitry, of accelerometer 10. For example, electrical traces 32 and 42 may be deposited on a portion of mounting pads 34 and 44 respectively. When upper and lower magnetic circuit assemblies 12 and 14 are mounted to opposite sides of proof mass assembly 20, electrical traces 32 and 42 may establish an electrical connection with upper and lower magnetic circuit assemblies 12 and 14 through the contact points on mounting pads 34 and 44.

Proof mass assembly 20 also includes proof mass 22, which may include one or more capacitance pick-off plates (e.g., upper capacitance pick-off plate 26) and one or more force-rebalancing coils mounted on upper (e.g., upper force-rebalancing coil 36) and/or lower (e.g., upper force-rebalancing coil 37) surfaces of proof mass 22. While the disclosure describes the operation of accelerometer in terms of upper capacitance pick-off plate 26 and upper force-rebalancing coil 36, such descriptions may equally apply to the use of a lower capacitance pick-off plate and lower force-rebalancing coil, combinations of upper and lower capacitance pick-off plates and lower force-rebalancing coils. Other means of measuring the deflection of proof mass 22 due to acceleration are also contemplated by this disclosure.

In some examples, upper capacitance pick-off plate 26 may cooperate with the inwardly facing surfaces of upper magnetic circuit assembly 12 (e.g., similar to inwardly facing surface of lower magnetic circuit assembly 14 shown in FIG. 1) to provide a capacitive pick-off system. Electrical connections to upper capacitance pick-off plate 26 may be established through one or more of the thin film leads (e.g., thin film lead 30) on flexures 28 and 38. In some examples, upper capacitance pick-off plate 26 may be directly electrically connected (e.g., physically connected) to thin film lead 30. In some examples, upper capacitance pick-off plate 26 may be indirectly electrically connected to thin film lead 30 using, for example, an electrical trace (not shown) or the like to establish the electrical connection across a portion of proof mass 22.

Upper capacitance pick-off plate 26 may be formed using any suitable technique. For example, portions of proof mass 22 may be masked to define upper capacitance pick-off plate 26 followed by deposition of a conductive material using, for example, chemical vapor deposition, physical vapor deposition (e.g., electron beam evaporation or sputtering), or the like. In some examples, upper capacitance pick-off plate 26 may include a layer of chromium formed on the surface of proof mass 22 followed by a layer of gold formed on the layer of chromium. In some examples, upper capacitance pick-off plate 26 may be formed simultaneously with electrical traces 32, 42, and 46 using the same conductive materials. In other examples, upper capacitance pick-off plate 26 may be formed separately from electrical traces 32, 42, and 46 using the same or different conductive materials. While, upper capacitance pick-off plate 26 is depicted as a c-shaped capacitor pick-off plate, it is contemplated that upper capacitance pick-off plate 26 may take the form of any suitable shape configured to measure a capacitance with upper stator 12.

In some examples, upper capacitance pick-off plate 26 and upper force-rebalancing coil 36 may be configured to interact with upper magnetic circuit assembly 12 to measure the acceleration applied to accelerometer 10. For example, as acceleration is applied to accelerometer 10, proof mass 22 may deflect from a null position, causing a distance of the capacitance gap between upper capacitance pick-off plate 26 and the inwardly facing surface of upper magnetic circuit assembly 12 to change (e.g., increase or decrease), resulting in a change in a capacitance and, correspondingly, a change in a capacitance measurement. In some examples, the change in the capacitance may be used to determine the amount of acceleration applied to accelerometer 10.

Additionally or alternatively, accelerometer 10 may be configured to apply an electrical current to upper force-rebalancing coil 36 (e.g., through thin film lead 40) based on the change in capacitance such that upper force-rebalancing coil 36 in conjunction with an magnetic pole piece of upper magnetic circuit assembly 12 acts as a servo to maintain the position proof mass 22 at a null position. In such examples, the current applied to upper force-rebalancing coil 36 to maintain proof mass 22 at the null position is proportional to and may be used to determine the amount of acceleration applied to accelerometer 10. For example, a magnitude of the current to force-rebalancing coil 36 may be a measure of acceleration of proof mass 22 along input axis 51.

In some examples, upper force-rebalancing coil 36 may be attached to an upper or lower surface of proof mass 22. Upper force-rebalancing coil 36 may be formed, for example, of a copper coil and attached to one of the respective surfaces of proof mass 22 using suitable techniques. In some examples, upper force-rebalancing coil 36 may include a coil form (e.g., anodized aluminum form) that provides additional support for the coil. In such examples, the coil form may be mounted directly to the surface of proof mass 22 using, for example, a compliant elastomer. The compliant elastomer may help alleviate possible CTE mismatches between the coil form and base materials of proof mass 22.

Upper force-rebalancing coil 36 may be electrically connected to other electronic components of accelerometer 10 through one or more of the thin film leads (e.g., thin film lead 40) on flexures 28 and 38. In some examples, upper force-rebalancing coil 36 may be directly electrically connected (e.g., physically connected) to thin film lead 40. In some examples, upper force-rebalancing coil 36 may be indirectly electrically connected to thin film lead 40 using, for example, an electrical trace 46 or the like to establish the electrical connection across a portion of proof mass 22.

In some examples, proof mass assembly 20 may be assembled with magnetic circuit assemblies 12 and 14 at an outer diameter portion of proof mass assembly 20. Upper and lower magnetic circuit assemblies 12 and 14 may be attached (e.g., clamped) to opposite sides of proof mass assembly 20 using one or more of the respective mounting pads (e.g., mounting pads 34 and 44).

Upper and lower magnetic circuit assemblies 12 and 14 may be made from any suitable material including, for example, invar, super invar, or the like. Invar has a relatively low CTE of about 2 parts-per-million (ppm) per degree centigrade (° C.), which may improve compatibility aspects between upper and lower magnetic circuit assemblies 12 and 14 and the base materials used to form proof mass assembly 20, e.g., described below.

Upper and lower magnetic circuit assemblies 12 and 14 each include a magnet assembly 50 and an excitation ring 52 (not labeled for upper magnetic circuit assembly 12). Magnet assembly 50 defines input axis 51 through accelerometer 10. Magnet assembly 50 includes a pole piece 56 and a magnet 54 underlying pole piece 56. In the example shown, magnet 54 is overlying excitation ring 52 (e.g., at least a portion of excitation ring 52 opposite inward facing surface 60 and within coil gap 58), and pole piece 56 is overlying magnet 54. Magnet 54 may be configured to provide a magnetic field to drive magnetic circuits of lower magnetic circuit assembly 14. In some examples, magnet 54 may be made of Alnico, samarium-cobalt, neodymium-iron-boron, or other such materials. In some examples, magnet 54 may be manufactured from a relatively high CTE material. A relatively high CTE material may have a CTE higher than a relatively low CTE material, such as a relatively low CTE material of upper base layer 68 or outer ring 62. A relatively high CTE material may be, for example, a material having a CTE greater than about 8 ppm/° C. For example, magnet 54 may be manufactured from alnico, having a CTE of about 11 ppm/° C.

Excitation ring 52 may be configured to provide a magnetic return path for the magnetic field generated by magnet 54. For example, excitation ring 52 may have a generally cylindrical shape with a "C" cross section. Pole piece 56 may be a magnetic structure that focuses a magnetic field created by magnet 54 to drive upper magnetic circuit assembly 12. For example, pole piece 56 may direct the magnetic field to flow through force-rebalancing coil 36. By directing the magnetic field through force-rebalancing coil 36, the magnetic field may enter excitation ring 52 and flow around to the opposite side of magnet 54 through excitation ring 52, and flow back through magnet 54 to pole piece 56, completing the magnetic circuit. In some examples, excitation ring 52 may be manufactured from materials having relatively high relative magnetic permeability, such as a maximum relative magnetic permeability greater than about 1500. In some examples, excitation ring 52 may be manufactured from materials that saturate at relatively high magnetic flux densities, such as greater than about 5000 gausses.

In some examples, upper and lower magnetic circuit assemblies 12 and 14 may include inwardly (i.e., toward proof mass assembly 20) facing surfaces 60 configured to interact with portions of proof mass assembly 20. Upper and lower magnetic circuit assemblies 12 and 14 may also include a coil gap 58 along a respective inwardly facing surface with magnet assembly positioned therein. Coil gap 58 may be configured to receive force-rebalancing coil 36 of proof mass assembly 20. In some examples, at least a portion of excitation ring 52 may be manufactured from a material having a relatively high relative magnetic permeability to provide a magnetic return path, such as invar or super invar.

The magnetic flux of upper and lower magnetic circuit assemblies 12 and 14 may vary along a magnetic return path. For example, portions of excitation ring 52 and pole piece 56 near an interface with magnet 54 and an outer radius of magnet 54 may experience higher magnetic flux than other parts of magnetic circuit assemblies 12 and 14. In some instances, a sufficiently high magnetic flux density may saturate, resulting in an uneven or unstable magnetic field with which proof mass assembly 20 may interact.

In accordance with the examples disclosed herein, proof mass assembly 20 and/or components of proof mass assembly 20, such as proof mass support structure 24 and proof mass 22, may be made from a material different from upper and lower magnetic circuit assemblies 12 and 14 and having a CTE that is substantially the same as the material of upper and lower magnetic circuit assemblies 12 and 14. For example, proof mass assembly 20 may be made of material having a CTE that is different from the CTE of upper and lower magnetic circuit assemblies 12 and 14 by equal to or less than 0.5 ppm/° C. In some examples, proof mass assembly 20 may comprise an inorganic glass ceramic. In some examples, proof mass assembly 20 may comprise a plurality of micro-crystallites embedded within a glassy phase. For example, proof mass assembly 20 may comprise, and/or be made of a Zerodur® material, such as a Zerodur® K20. In some examples, upper and lower magnetic circuit assemblies 12 and 14 may comprise invar having a CTE of about 1.5 ppm/° C., and proof mass assembly 20 may comprise Zerodur® K20 having a CTE of about 1.6 ppm/° C., or about 1.5 ppm/° C.

In some examples, the proof mass assembly 20 is made of a monolithic part of the material having a CTE different than the CTE of upper and lower magnetic circuit assemblies 12 and 14 by of equal to or less than 0.5 ppm/° C. For example, proof mass 22, proof mass support structure 24, and at least one of flexures 28 and 38 are formed from a monolithic piece of material, e.g., Zerodur® K20, having a CTE different than the CTE of upper and lower magnetic circuit assemblies 12 and 14 by of equal to or less than 0.5 ppm/° C., e.g., via etching, laser cutting, ultrasonic machining, or the like.

In some examples, forming proof mass assembly 20 from a material having a CTE that is different from the upper and lower magnetic circuit assemblies 12 and 14 by equal to or less than 0.5 parts per million per degree Celsius (ppm/° C.) changes the overall CTE of the assembly, and the outer support structure (e.g., bellyband) may need to be formed of a material with an increased CTE, and/or increase a preload clamping force applied to upper and lower magnetic circuit assemblies 12 and 14 and proof mass assembly 20 during assembly, in order to achieve and/or maintain a desired axial preload force keeping upper and lower magnetic circuit assemblies 12 and 14 and proof mass assembly 20 together, e.g., via the bellyband. In some examples, the bellyband may comprise a material having a CTE that is different from the CTE of upper and lower magnetic circuit assemblies 12 and 14 and/or proof mass assembly 20 by equal to or more than 1.0 ppm/° C. For example, the bellyband may comprise Alloy 42 and may be coupled to outer surfaces of each of upper and lower magnetic circuit assemblies 12 and 14, upper and lower magnetic circuit assemblies 12 and 14 may comprise Invar, and proof mass assembly 20 may comprise Zerodur® K20.

In some examples, accelerometer 10 may heat and/or cool during use, e.g., when exposed to differing environmental conditions. In an accelerometer in which the CTE's of components, e.g., upper and lower magnetic circuit assemblies 12 and 14 and proof mass assembly 20, is not substantially matched, changes in temperature of the accelerometer or its components may induce strain and/or slippage (e.g., movement) between components. Strain on proof mass assembly 20 may be strain on proof mass support structure 24, which may warp and/or change motion of proof mass 20 and/or flexures 28 and 38. For example, such temperature differences may induce strain on proof mass support structure 24 and warping of proof mass 22. In some examples, such strain and warping may be symmetric, and the response of the accelerometer may be repeatable, but may cause a bias in the response of the accelerometer, e.g., a bias offset, which may not be repeatable as the accelerometer heats and/or cools and result in hysteresis in proof mass 22 response to acceleration, e.g., hysteresis in the response of the accelerometer. In some examples, strain on proof mass support structure 24 may be relieved via motion of proof mass support structure 24, e.g., a changing of shape of proof mass structure 24 which may slip between mounting pads 34, 44, and 49 in order to move. Such slippage may relieve strain on proof mass assembly 20 (e.g., proof mass support structure 24), but may not be repeatable and cause the response of the accelerometer to change as the accelerometer heats and cools, and to be different when the accelerometer comes back to the same temperature.

In accordance with the techniques described herein, accelerometer 10 is configured to improve hysteresis effects, e.g., to reduce hysteresis of accelerometer 10 and thereby improve the repeatability and reliability of the response of accelerometer 10 to acceleration in a variety of environmental conditions, such as when used in environments with a relatively large temperature range (e.g., from or between negative 55° C. to positive 95° C.). For example, substantially matching the CTE of proof mass assembly 20 and upper and lower magnetic circuit assemblies 12 and 14 (e.g., to within 0.5 ppm/° C.) may change and/or reduce strain on proof mass assembly 20, e.g., induced by changes in temperature of accelerometer 10.

In some examples, matching the CTE of the materials of upper and lower magnetic circuit assemblies 12 and 14 and proof mass assembly 20 may enable structural changes to accelerometer 10. For example, flexures 28 and 38 may be made with increased stiffness and/or thickness that would otherwise be problematic due to CTE mismatch induced strain on proof mass assembly 20. For example, a thickness of one or both of flexures 28 and 38 may be configured to allow proof mass 20 to vibrate at a primary vibration mode between 10 Hz and 30 Hz upon an acceleration of the accelerometer. In some examples, a thickness of one or both flexures 28 and 38 may additionally, or alternatively, be configured to reduce or eliminate a vibration mode of the proof mass between 1500 Hz and 3000 Hz. In some examples, any or all of a thickness of one or both flexures 28 and 38, a difference between the CTE of upper and lower magnetic circuit assemblies 12 and 14 and proof mass assembly 20, and a difference between the CTE of upper and lower magnetic circuit assemblies 12 and 14 and/or proof mass assembly 20 and the bellyband may additionally, or alternatively, be configured to reduce or eliminate a hysteresis of the accelerometer upon an environment of the accelerometer changing between negative 55° C. to positive 95° C. For example, the CTEs of each of upper and lower magnetic circuit assemblies 12 and 14, proof mass assembly 20, and the bellyband may be tailored, designed, or otherwise configured together to reduce or eliminate a hysteresis of the accelerometer upon an environment of the accelerometer changing between negative 55° C. to positive 95° C.

Figure 3:
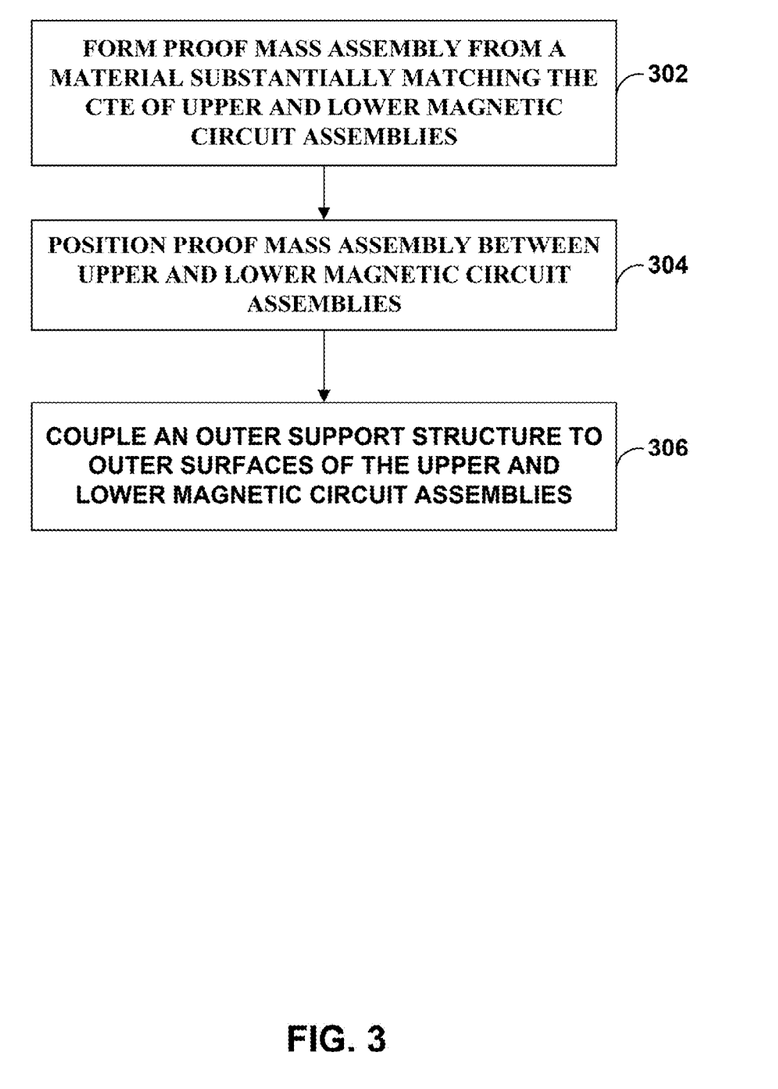
FIG. 3 is a flow diagram illustrating an example technique for making an example accelerometer in accordance with the disclosure.

Accelerometer 10 may be formed using any suitable technique. FIG. 3 is a flow diagram illustrating an example technique for forming an example accelerometer in accordance with the disclosure, such as, for example accelerometer 10. While the technique shown in FIG. 3 is described with respect to accelerometer 10, in other examples, the techniques may be used to form other accelerometers or portions of accelerometers that include different configurations, or the accelerometers or portions of accelerometers described herein may be form using other techniques.

A manufacturer may form a proof mass assembly 20 comprising a material having a CTE that substantially matches the CTE of upper and lower magnetic circuit assemblies 12 and 14 (302). For example, manufacturer may form proof mass assembly 20, including proof mass 22, proof mass support structure 22, and one or both of flexures 28 and 38, from a monolithic material piece, e.g., a monolithic substrate of Zerodur® K20.

The manufacturer may position proof mass assembly 20 between upper and lower magnetic circuit assemblies 12 and 14, e.g., between the upper and lower excitation rings of upper and lower magnetic circuit assemblies 12 and 14 (304). In some examples, upper and lower magnetic circuit assemblies 12 and 14 may comprise Invar.

The manufacturer may couple an outer support structure (e.g., bellyband) to an outer surface of each of the upper and lower magnetic circuit assemblies 12 and 14 (306). For example, the manufacturer may apply an axial preload force to upper and lower magnetic circuit assemblies 12 and 14 to clamp proof mass assembly 20 between upper and lower magnetic circuit assemblies 12 and 14, couple the bellyband to the outer surfaces of both upper and lower magnetic circuit assemblies 12 and 14, apply an epoxy at the boundaries between the bellyband and the outer surfaces of upper and lower magnetic circuit assemblies 12 and 14, cure the epoxy at an elevated temperature, and allow the assembly (e.g., upper and lower magnetic circuit assemblies 12 and 14, proof mass assembly 20, and the bellyband) to cool. In some examples, the bellyband may have a CTE that is different from one or both of upper and lower magnetic circuit assemblies 12 and 14 and proof mass assembly 20, e.g., by equal to or more than 1.0 ppm/° C. For example, the bellyband may comprise Alloy 42. The bellyband may be configured to achieve and/or maintain a desired, final (e.g., when accelerometer is assembled and cooled from the elevated temperature) axial preload compression force on upper and lower magnetic circuit assemblies 12 and 14, e.g., via the bellyband shrinking at a greater rate than upper and lower magnetic circuit assemblies 12 and 14 and proof mass assembly 20 due to the CTE mismatch between the bellyband and upper and lower magnetic circuit assemblies 12 and 14 and proof mass assembly 20.

The techniques of this disclosure may also be described in the following examples.

Example 1

An accelerometer comprising: a first excitation ring comprising a first material having a first coefficient of thermal expansion (CTE); a second excitation ring comprising the first material having the first CTE; and a proof mass assembly disposed between and in contact with the first excitation ring and the second excitation ring, the proof mass assembly comprising a second material having a second CTE, wherein a difference between the first CTE and the second CTE is equal to or less than 0.5 parts per million per degree Celsius (ppm/° C.).

Example 2

The accelerometer of example 1, wherein the second material comprises an inorganic glass ceramic.

Example 3

The accelerometer of example 1 or example 2, wherein the second material comprises a plurality of micro-crystallites embedded within a glassy phase.

Example 4

The accelerometer of any one of examples 1 through 3, wherein the first material comprises Invar and the second material comprises Zerodur® K20.

Example 5

The accelerometer of any one of examples 1 through 4, wherein the proof mass assembly comprises: a proof mass; a support structure; and at least one flexure mechanically coupling the proof mass to the support structure, wherein the at least one flexure is configured to allow the proof mass to move relative to the support structure in at least one direction, and wherein each of the proof mass, support structure, and at least one flexure comprise the second material having the second CTE.

Example 6

The accelerometer of example 5, wherein the proof mass, support structure, and at least one flexure are formed from the same monolithic second material.

Example 7

The accelerometer of example 5 or example 6, further comprising an outer support structure coupled to an outer surface of each of the upper and lower excitation rings, wherein the outer support structure comprises a third material having a third CTE, wherein a difference between the first CTE and the third CTE is equal to or more than 1.0 ppm/° C.

Example 8

The accelerometer of example 7, wherein the outer support structure is configured to maintain a first axial compression preload force between the first and second excitation rings.

Example 9

The accelerometer of example 8, wherein a thickness of the at least one flexure is configured to allow the proof mass to vibrate at a primary vibration mode between 10 Hz and 30 Hz upon an acceleration of the accelerometer.

Example 10

The accelerometer of example 9, wherein the thickness of the at least one flexure is configured to reduce or eliminate a vibration mode of the proof mass between 1500 Hz and 3000 Hz.

Example 11

The accelerometer of example 9 or example 10, wherein the thickness of the at least one flexure, the difference between the first CTE and the second CTE, and the difference between the first CTE and the third CTE are configured together to reduce a hysteresis of the accelerometer upon an environment of the accelerometer changing between negative 55° C. to positive 95° C.

Example 12

A transducer comprising: a first excitation ring comprising Invar having a first coefficient of thermal expansion (CTE); a second excitation ring comprising Invar and having the first CTE; a proof mass assembly disposed between and in contact with the first excitation ring and the second excitation ring, the proof mass assembly comprising Zerodur® K20 having a second CTE, wherein a difference between the first CTE and the second CTE is equal to or less than 0.5 parts per million per degree Celsius (ppm/° C.).

Example 13

The transducer of example 12, further comprising: an outer support structure coupled to an outer surface of each of the upper and lower excitation rings, wherein the outer support structure comprises Alloy 42 having a third CTE, wherein a difference between the first CTE and the third CTE is equal to or more than 1.0 ppm/oC.

Example 14

The transducer of example 13, wherein the outer support structure is configured to maintain a first axial compression preload force between the first and second excitation rings.

Example 15

The transducer of example 14, wherein the first axial compression preload force, the difference between the first CTE and the second CTE, and the difference between the first CTE and the third CTE are configured together to reduce or eliminate a hysteresis of the accelerometer upon an environment of the accelerometer changing between negative 55 oC to positive 95 oC.

Example 16

The transducer of any one of examples 12 through 15, wherein the proof mass assembly comprises: a proof mass; a support structure; and at least one flexure mechanically coupling the proof mass to the support structure, wherein the at least one flexure is configured to allow the proof mass to move relative to the support structure in at least one direction, and wherein each of the proof mass, support structure, and at least one flexure comprise Zerodur® K20 having the second CTE.

Example 17

The transducer of example 16, wherein the proof mass, support structure, and at least one flexure are formed from a same monolith of Zerodur® K20 having the second CTE.

Example 18

The transducer of example 17, wherein a thickness of the at least one flexure is configured to allow the proof mass to vibrate at a primary vibration mode between 10 Hz and 30 Hz upon an acceleration of the transducer.

Example 19

The accelerometer of example 18, wherein the thickness of the at least one flexure is configured to reduce or eliminate a vibration mode of the proof mass between 1500 Hz and 3000 Hz.

Example 20

A proof mass assembly comprising: a proof mass; a support structure; and at least one flexure mechanically coupling the proof mass to the support structure, wherein the at least one flexure is configured to allow the proof mass to move relative to the support structure in at least one direction, and wherein each of the proof mass, support structure, and at least one flexure comprise Zerodur® K20 having a first CTE, wherein the proof mass assembly is configured to be disposed between and in contact with a first excitation ring and a second excitation ring each comprising a second material having a second CTE, and wherein a difference between the first CTE and the second CTE is equal to or less than 0.5 parts per million per degree Celsius (ppm/° C.).

Various examples of the disclosure have been described. These and other examples are within the scope of the following claims.

What is claimed is:

1. An accelerometer comprising:
a first excitation ring comprising Invar having a first coefficient of thermal expansion (CTE) of about 1.5 parts per million per degree Celsius (ppm/° C.);
a second excitation ring comprising Invar having the first CTE;
a proof mass assembly disposed between and in contact with the first excitation ring and the second excitation ring, the proof mass assembly comprising a second material having a second CTE of about 1.6 ppm/° C., wherein a difference between the first CTE and the second CTE is equal to or less than 0.5 parts per million per degree Celsius (ppm/° C.), and
an outer support structure comprising Alloy 42 and coupled to an outer surface of each of the first and second excitation rings, wherein the outer support structure comprises a third material having a third CTE, wherein a difference between the first CTE and the third CTE is equal to or more than 1.0 ppm/° C.

2. The accelerometer of claim 1, wherein the second material comprises a plurality of micro-crystallites embedded within a glassy phase.

3. The accelerometer of claim 1, wherein the second material comprises Zerodur K20 (a lithium aluminosilicate glass-ceramic material comprising a plurality of micro-crystallites comprising keatite).

4. The accelerometer of claim 1, wherein the proof mass assembly comprises:
a proof mass;
a support structure; and
at least one flexure mechanically coupling the proof mass to the support structure, wherein the at least one flexure is configured to allow the proof mass to move relative to the support structure in at least one direction, and
wherein each of the proof mass, the support structure, and the at least one flexure comprise the second material have the second CTE.

5. The accelerometer of claim 4, wherein the proof mass, the support structure, and the at least one flexure are formed from the same monolithic second material.

6. The accelerometer of claim 1, wherein the outer support structure is configured to maintain a first axial compression preload force between the first and second excitation rings.

7. The accelerometer of claim 6, wherein a thickness of the at least one flexure is configured to allow the proof mass to vibrate at a primary vibration mode between 10 Hz and 30 Hz upon an acceleration of the accelerometer.

8. The accelerometer of claim 7, wherein the thickness of the at least one flexure is configured to reduce or eliminate a vibration mode of the proof mass between 1500 Hz and 3000 Hz.

9. The accelerometer of claim 7, wherein the thickness of the at least one flexure, the difference between the first CTE and the second CTE, and the difference between the first CTE and the third CTE are configured together to reduce a hysteresis of the accelerometer upon an environment of the accelerometer changing between negative 55° C. to positive 95° C.

10. A transducer comprising:
a first excitation ring comprising Invar having a first coefficient of thermal expansion (CTE) of about 1.5 parts per million per degree Celsius (ppm/° C.);
a second excitation ring comprising Invar and having the first CTE;
a proof mass assembly disposed between and in contact with the first excitation ring and the second excitation ring, the proof mass assembly comprising Zerodur K20 (a lithium aluminosilicate glass-ceramic material comprising a plurality of micro-crystallites comprising keatite) having a second CTE, wherein a difference between the first CTE and the second CTE is equal to or less than 0.5 parts per million per degree Celsius (ppm/° C.); and
an outer support structure coupled to an outer surface of each of the first and second excitation rings, wherein the outer support structure comprises Alloy 42 having a third CTE, wherein a difference between the first CTE and the third CTE is equal to or more than 1.0 ppm/° C.

11. The transducer of claim 10, wherein the outer support structure is configured to maintain a first axial compression preload force between the first and second excitation rings.

12. The transducer of claim 11, wherein the first axial compression preload force, the difference between the first CTE and the second CTE, and the difference between the first CTE and the third CTE are configured together to reduce or eliminate a hysteresis of the accelerometer upon an environment of the accelerometer changing between negative 55° C. to positive 95° C.

13. The transducer of claim 10, wherein the proof mass assembly comprises:
a proof mass;
a support structure; and
at least one flexure mechanically coupling the proof mass to the support structure, wherein the at least one flexure is configured to allow the proof mass to move relative to the support structure in at least one direction, and
wherein each of the proof mass, the support structure, and the at least one flexure comprise Zerodur K20 having the second CTE.

14. The transducer of claim 13, wherein the proof mass, the support structure, and the at least one flexure are formed from a same monolith of Zerodur K20 having the second CTE.

15. The transducer of claim 14, wherein a thickness of the at least one flexure is configured to allow the proof mass to vibrate at a primary vibration mode between 10 Hz and 30 Hz upon an acceleration of the transducer.

16. The accelerometer of claim 15, wherein the thickness of the at least one flexure is configured to reduce or eliminate a vibration mode of the proof mass between 1500 Hz and 3000 Hz.

17. A proof mass assembly comprising:
a proof mass;
a support structure;
at least one flexure mechanically coupling the proof mass to the support structure, wherein the at least one flexure is configured to allow the proof mass to move relative to the support structure in at least one direction,
wherein each of the proof mass, the support structure, and the at least one flexure comprise Zerodur K20 having (a lithium aluminosilicate glass-ceramic material comprising a plurality of micro-crystallites comprising keatite) a first coefficient of thermal expansion (CTE),
wherein the proof mass assembly is configured to be disposed between and in contact with a first excitation ring and a second excitation ring each comprising a second material having a second CTE of about 1.5 parts per million per degree Celsius (ppm/° C.), and
wherein a difference between the first CTE and the second CTE is equal to or less than 0.5 parts per million per degree Celsius (ppm/° C.); and
an outer support structure coupled to an outer surface of each of the first and second excitation rings, wherein the outer support structure comprises having a third CTE, wherein a difference between the second CTE and the third CTE is equal to or more than 1.0 ppm/° C.

* * * * *